April 12, 1966  A. H. MARK ETAL  3,245,208
PULL-TYPE COMBINE

Filed Sept. 26, 1963  4 Sheets-Sheet 1

INVENTORS
ALEXANDER HING MARK
JOSEPH NECAS
JERZY M. BRZUSTOWSKI
by: Wolfe, Hubbard, Voit & Osann
ATTYS.

INVENTORS
ALEXANDER HING MARK
JOSEPH NECAS
JERZY M. BRZUSTOWSKI
by: Wolfe, Hubbard, Voit & Osann
ATTYS.

April 12, 1966  A. H. MARK ETAL  3,245,208
PULL-TYPE COMBINE
Filed Sept. 26, 1963  4 Sheets-Sheet 3
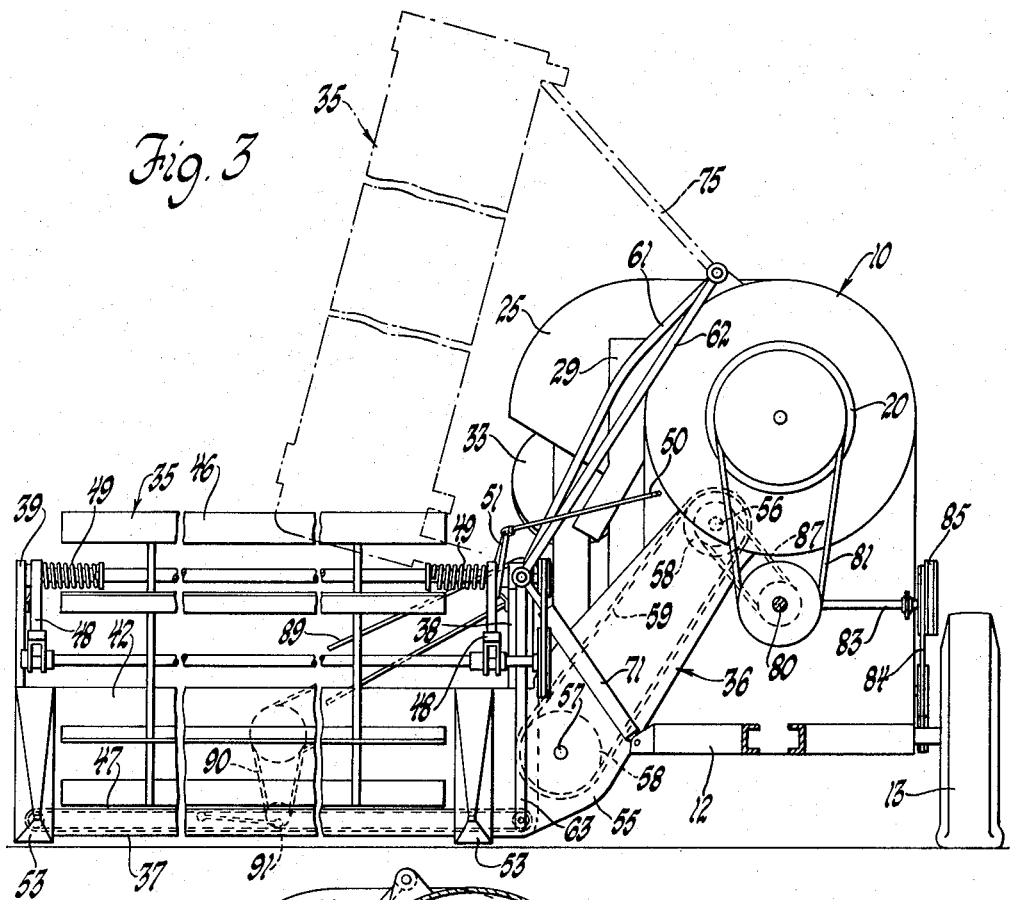
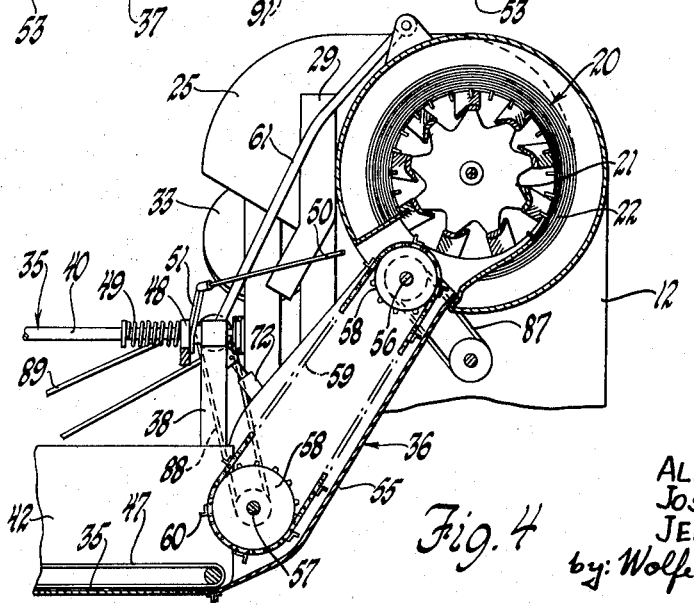
INVENTORS
ALEXANDER HING MARK
JOSEPH NECAS
JERZY M. BRZUSTOWSKI
by: Wolfe, Hubbard, Voit & Osann
ATTYS.

April 12, 1966   A. H. MARK ETAL   3,245,208
PULL-TYPE COMBINE
Filed Sept. 26, 1963   4 Sheets-Sheet 4
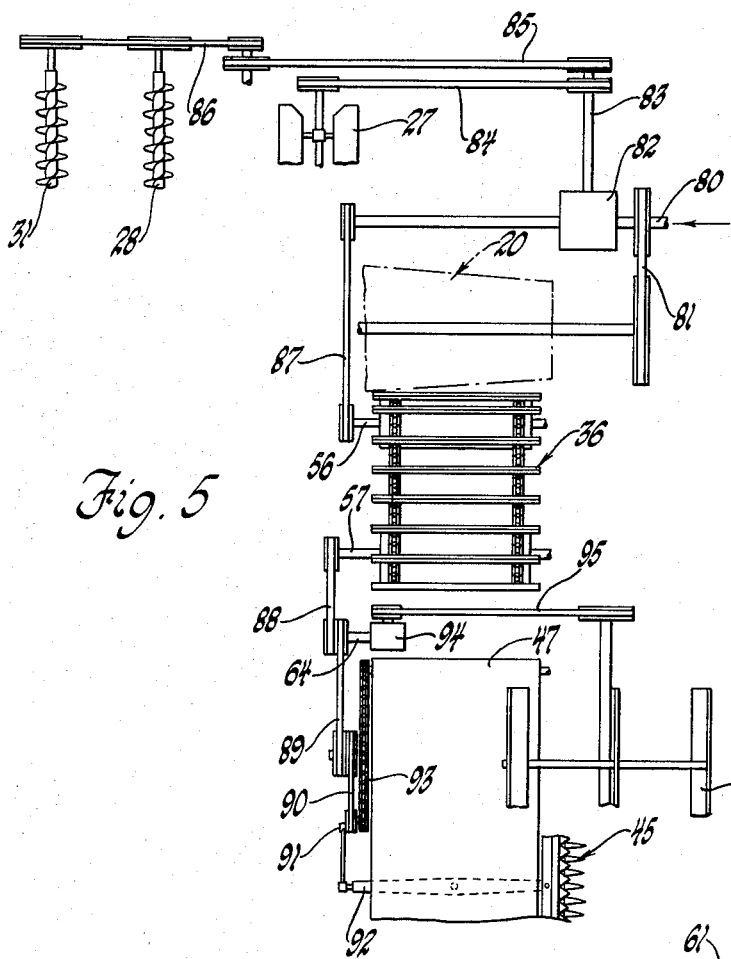
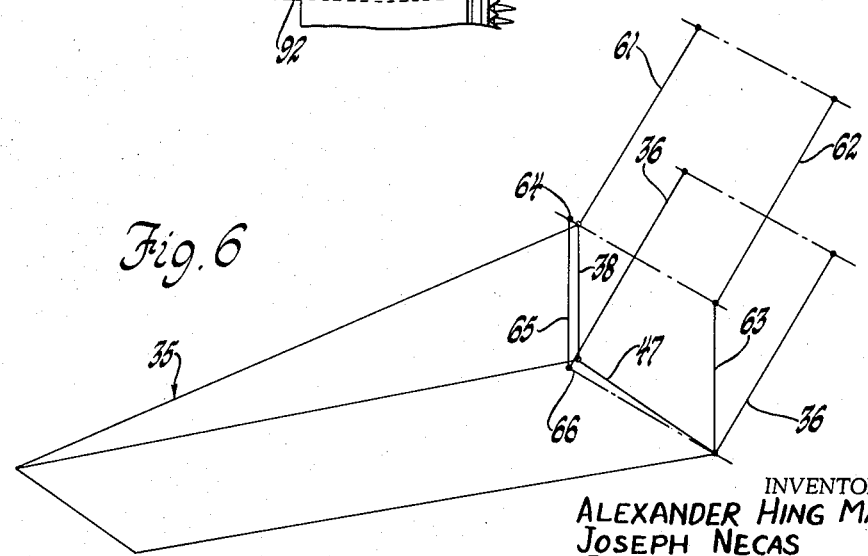
INVENTORS
ALEXANDER HING MARK
JOSEPH NECAS
JERZY M. BRZUSTOWSKI
by: Wolfe, Hubbard, Voit & Osann
ATTYS.

United States Patent Office 3,245,208
Patented Apr. 12, 1966

3,245,208
PULL-TYPE COMBINE
Alexander Hing Mark, Livonia, Mich., and Joseph Necas and Jerzy M. Brzustowski, Toronto, Ontario, Canada, assignors to Massey-Ferguson Limited, Toronto, Ontario, Canada, a corporation of Canada
Filed Sept. 26, 1963, Ser. No. 311,856
5 Claims. (Cl. 56—21)

This invention relates to agricultural combines and concerns, more particularly, pull-type combines adapted to be drawn by a conventional tractor.

A ground wheel supported, pull-type combine is superior in certain respects to tractor propelled combines which mount on the tractor or are secured at one side of the tractor. The pull-type implement can be more quickly and conveniently secured to the tractor, and the directly trailing load makes tractor steering substantially more simple. The problem with such combines, however, is to obtain sufficient grain handling capacity without widening the implement to the point where the advantages of pull-type operation are lost.

It is also necessary to provide a pull-type combine with a laterally extending harvesting table, and provision must be made for both adjusting the table for control of cutting height and shifting the table to an out-of-the-way transport position. In the past, these requirements have led to somewhat complex structures requiring disassembly of combine parts, which is neither economical nor convenient.

The present invention lies in a pull-type combine having an axial flow thresher and separator assembly arranged longitudinally of the combine body and to which harvested material is transversely fed by a laterally extending table. The invention also lies in mounting the laterally extending table of a pull-type combine through a parallelogram linkage for cutting height adjustment, preferably with the lower link being the elevator connecting the table and the combine, and adapting the table to swing into transport position about the upper link pivot and drive shaft axis so that transport position can be reached without partial disassembly of the table elements or disconnection of the table drive.

An example of the inventive combine is shown in the accompanying drawings, in which:

FIG. 1a is an enlarged fragmentary elevation taken approximately on the line 1a—1a in FIG. 1;

FIG. 3 is a front elevation of the combine shown in FIGS. 1 and 2;

FIG. 4 is a fragmentary section taken approximately along the line 4—4 in FIG. 2;

FIG. 5 is a partially diagrammatic layout of the drive for the combine shown in FIG. 1; and FIG. 6 is a diagrammatic perspective of the mounting linkage employed for the table of the combine shown in FIG. 1.

While the invention will be described in connection with a preferred embodiment, it will be understood that we do not intend to limit the invention to that embodiment. On the contrary, we intend to cover all alternatives, modifications and equivalents as may be included within the spirit and scope of the invention as defined by the appended claims.

Figure 1:
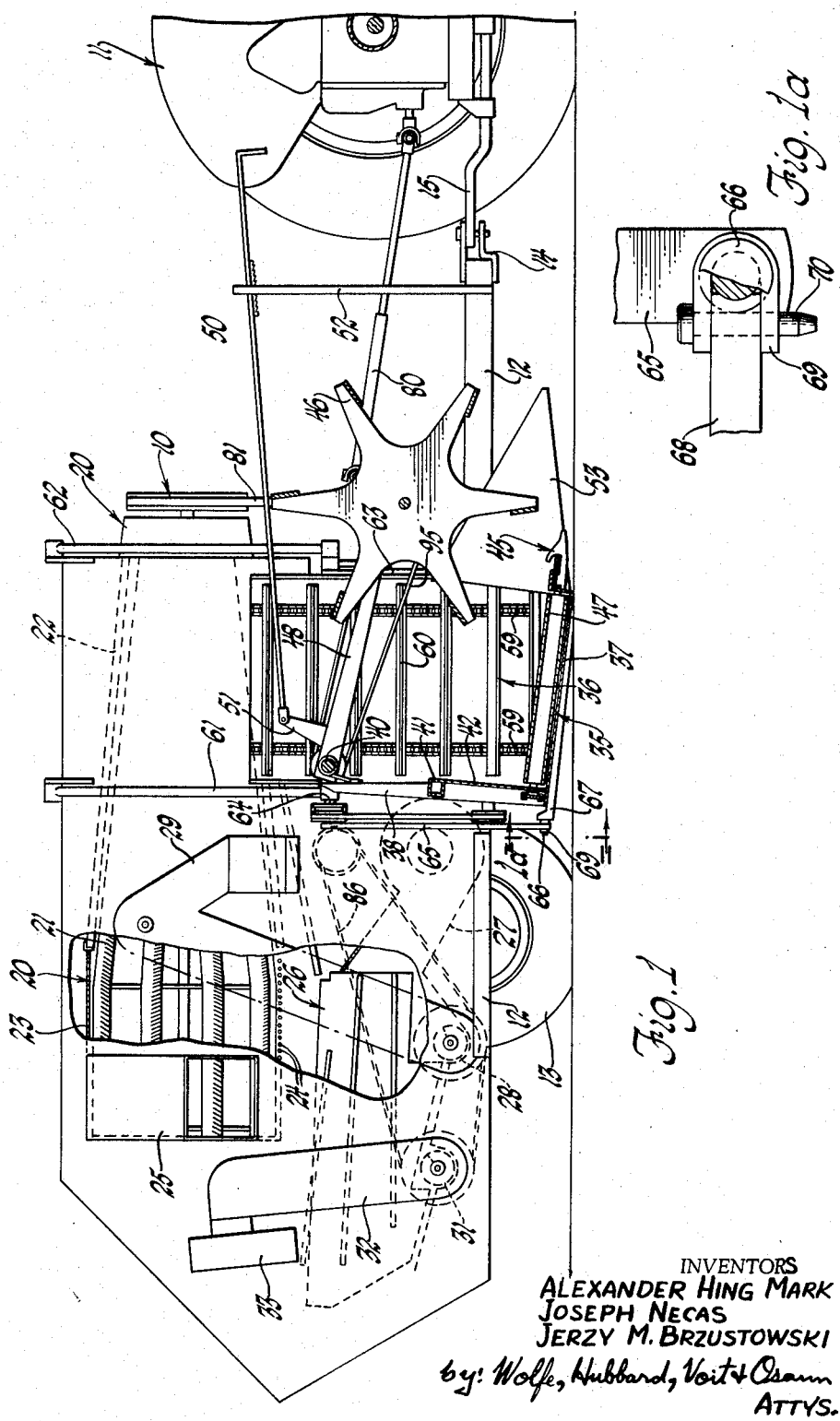
FIGURE 1 is a side elevation of a combine embodying the invention, with portions broken away, shown attached to a fragmentarily illustrated tractor.

Turning to FIG. 1, there is shown a pull-type combine 10 embodying the invention and coupled to a tractor 11 of which only the rear portion is fragmentarily shown. The combine 10 includes a frame 12 supported by laterally positioned ground engaging wheels 13 and having, at its forward portion, a tongue 14 releasably connected to a draw bar 15 mounted on the tractor 11.

The combine frame 12 carries an elongated rotary threshing and separating mechanism 20 which includes an axially feeding cylinder 21 journalled longitudinally in the combine 10. The cylinder 21 is formed of a plurality of rasp bars mounted on a central framework so as to define a generally conical periphery. Cooperating with the cylinder 21 is a tubular grate or concave 22 which is also conical to conform to the cylinder periphery. The rearward portion of the cylinder 21 is generally cylindrical and rotates within a surrounding housing 23 formed with a lower screen 24 through which the threshed grain is discharged. The threshing and separating mechanism 20 receives harvested material at its forward portion and the roating cylinder 21 drives the harvested material in a spiraling, helical path rearwardly of the assembly with the crop material being threshed between the rasp bars of the cylinder and the surrounding grate 22. At the rearward portion of the assembly 20, the grain drops downwardly through the screen 24 and the separated straw is discharged peripherally through a straw discharge chute 25. This form of threshing and separating mechanism is similar to those shown in the above-identified copending applications.

Figure 2:
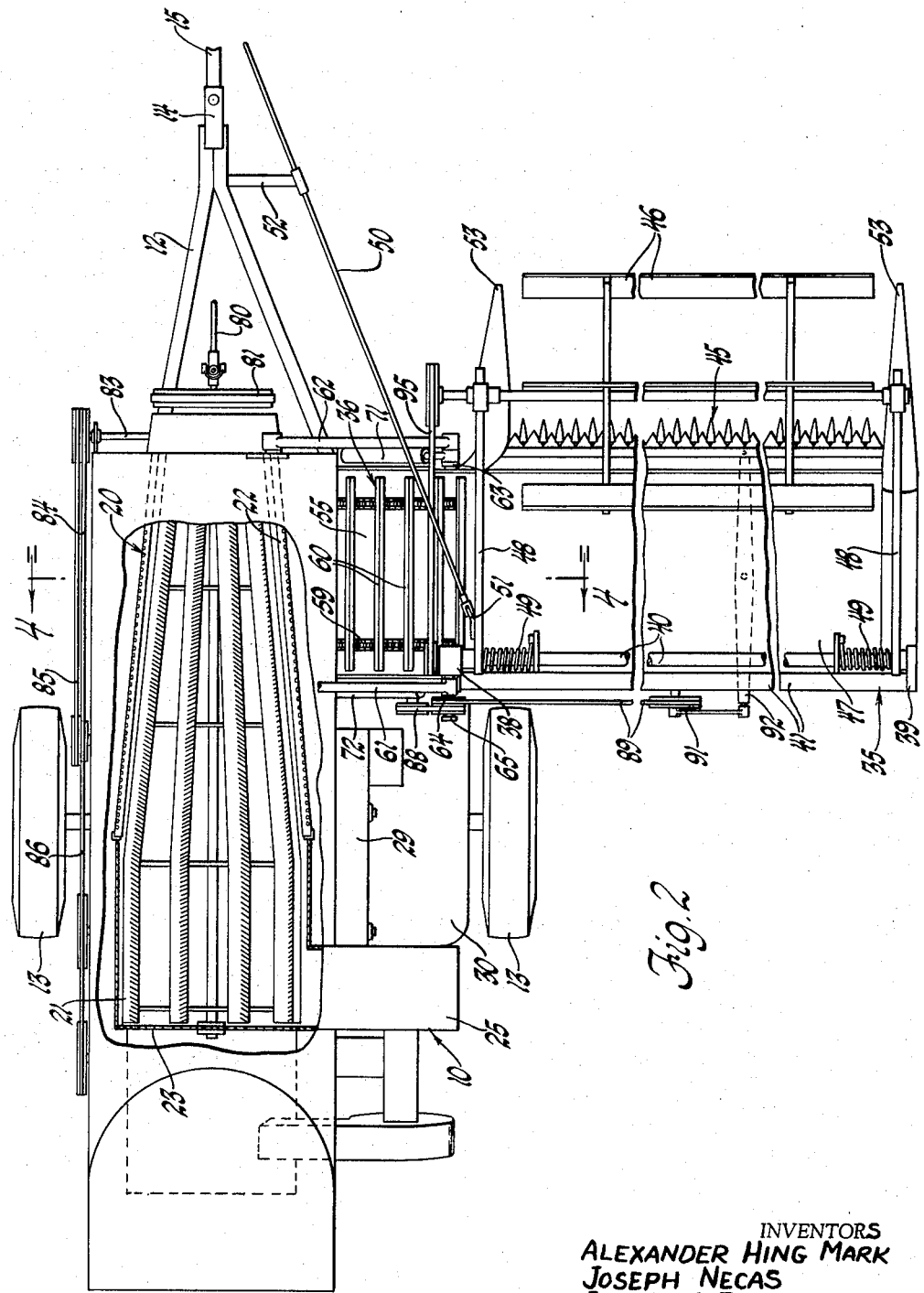
FIG. 2 is a plan, with portions broken away, of the combine shown in FIG. 1.

A shaker shoe assembly 26 is mounted in the combine frame so as to receive grain falling downwardly through the screen 24, and a fanning mill 27 is positioned to direct an upwardly moving blast of air through the shaker shoe assembly. Cleaned grain is received by a clean grain auger 28 and conveyed laterally of the combine to an elevator 29 which deposits the grain into a grain storage tank 30 (see FIG. 2). A tailings collection auger 31 is also positioned beneath the shaker shoe assembly 26 and is effective to deliver the tailings to an elevator 32 which feeds to a rethresher 33 that delivers the trailings back into the combine body and onto the shaker shoe assembly 26 for recleaning.

It can thus be readily seen that the main body portion of the combine 10 is an exceptionally narrow unit that can be trailed directly behind a propelling tractor.

For harvesting and gathering the crop, a harvesting table 35 extends laterally from the combine frame 12 at the forward end of the threshing and separating mechanism 20, and an undershot conveyer 36 is positioned to carry harvested material from the table 35 to the threshing and separating mechanism. The frame of the harvesting table 35 is defined by a floor 37 secured to end brackets 38 and 39 which are interconnected by a cross shaft 40 and a cross beam 41. A rear wind screen 42 extends between the cross beam 41 and the table floor 37.

The table 35 includes a cutter bar assembly 45 of the usual type which severs the crop material that is then fed by an overlying reel 46 to an apron conveyor 47 which extends the full width of the table 35 above the floor 37. The reel 46 is rotatably suspended on a pair of arms 48 which are pivoted on the cross shaft 40 and counterbalanced by springs 49. The vertical position of the reel 46 can be adjusted by a rod 50 secured to an upstanding finger 51 on one of the arms 48 and adjustably latched within a bracket 52 mounted on the combine frame 12. The table 35 also includes a pair of divider snouts 53 positioned at each end of the cutter bar assembly 45.

The elevator 36 includes a channel frame 55 which is pivoted on an upper shaft 56 journalled in the combine frame and which carries a lower shaft 57. The shafts 56, 57 support sprockets 58 about which are trained chains 59 carrying pusher bars 60 which move upwardly over the channel frame 55 in the usual manner of an undershot conveyor.

The table 35 is mounted for operation on a parallelogram linkage which includes the elevator 36 as the lower link. Paralleling the elevator 36 are bars 61 and 62 which constitute the upper links of the parallelogram linkage and are secured to the combine frame 12 directly above the elevator pivoting shaft 56 (see FIG. 3). The bar 62 is secured, at its lower end, to the table 35 by a drop link 63 whose lower end is pivoted to the table bottom 37. The bar 61 is pivoted on an idler shaft 64 which is journalled in the table end bracket 38 and which carries a drop link 65. The drop link 65 is releasably connected to the lower end of the elevator 36 and is pivoted to the rear side of the table 35. For this purpose, the link 65 rotatably surrounds a pin 66 extending rearwardly from a rib 67 secured to the bottom of the table floor 37 (see FIGS. 1 and 1a). A lug 68 is secured to the channel frame 55 of the elevator 36 and abuts, and is rotatably secured to, the pin 66 by a U-clamp 69 which surrounds the pin 66 and is secured to the lug 68 by a lock pin 70.

The parallelogram linkage supporting the table 35 is thus defined by the elevator 36 constituting the lower link, the bars 61, 62 the upper links, the combine frame as one vertical element, and the drop links 63, 65 as the opposite vertical elements (see FIG. 6). The end bracket 38 holds the rear of the apron conveyor 47 somewhat above the axis defined by the pin 66 so that the apron conveyor slopes downwardly toward the front of the table and the cutter bar 45.

To raise and lower the table 35 through its operating range, a pair of actuators 71 and 72 are anchored in the combine frame 12 and extend upwardly, respectively, to the outer pivot points of the bars 62 and 61. The actuators 71, 72 are preferably hydraulically powered and it can be seen that they are effective to raise and lower the table 35 while the parallelogram linkage maintains the table in a substantially horizontal, laterally extending position.

In order to swing the table 35 to an upraised transport position, the lock pin 70 and the U-clamp 69 are removed by the operator so as to free the table for swinging movement, on the ends of the bars 61, 62, to the dashed-line transport position shown in FIG. 3. Preferably, a retaining link 75 is provided for releasably securing the table in upraised, transport position. Since the table swings about what is the upper axis of its supporting parallelogram linkage, it can be seen that substantial ground clearance is obtained when the table is in transport position, and also that there is little in-folding of the table as it moves from operating to transport position with the result that it is not necessary to disassemble any of the table components, such as the reel 46, in order to position the table in upraised, transport relation.

The various elements of the combine 10 are driven from the tractor PTO through a telescoping, universal joint coupled, input shaft 80. The shaft 80 (see particularly FIG. 5) drives the separating and threshing mechanism 20 through a belt 81 and powers, through a gear box 82, a cross shaft 83. The shaft 83 drives the fanning mill 27 through a belt 84 and also powers the clean grain auger 28 and the tailings return auger 31 through belts 85 and 86. A belt 87 connects the input shaft 80 to the upper conveyor shaft 56 so as to power the conveyer 36. The lower conveyor shaft 57 is connected, through a belt 88, to the idler shaft 64 and the idler shaft constitutes the link through which power is transferred from the main body of the combine to the table 35. Belts 89 and 90 connect the idler shaft 64 to a crank 91 which drives the cutter bar assembly 45 through an arm 92. A chain 93 extends from the shaft of the crank 91 to the inner end of the apron conveyer 47 so as to power the conveyer. The idler shaft 64, through a gear box 94 and a belt 95, also drives the reel 46.

Since the idler shaft 64 is alined with the parallelogram supporting structure axis about which the table 35 is swung into transport position, it can be seen that the table can be moved between its solid and dashed-line positions shown in FIG. 3 without disconnecting the drive between the table and the main body of the combine.

The embodiments of the invention in which an exclusive property or privilege is claimed are defined as follows:

1. A pull-type combine including a wheeled body adapted to be hitched in trailing relation to a tractor and having a laterally extending harvesting table, characterized by including structure mounting said table on said body which defines a parallelogram linkage swinging in a vertical plane, said structure including an elevator for feeding harvested material laterally from said table to said body, said elevator being pivoted to both said body and said table and constituting the lower link of said linkage, and means for raising and lowering said table to adjust for cutting height, said linkage structure maintaining the table in a substantially horizontal position through the height adjustment range.

2. The combine of claim 1 in which said elevator is releasably pivoted to said table so that the table can be swung into transport position about that portion of said structure constituting the upper link of said linkage.

3. The combine of claim 1 in which said structure includes upper and lower longitudinally extending pivot axes at said table so that the table constitutes the outer element of said linkage, and said lower pivot axis being releasable so as to free the table for upward swinging movement about said upper axis into transport position.

4. The combine of claim 3 including a mechanical driving train between said body and said table, said train having an idler shaft journalled on said upper axis and constituting the link between the body and the table so that the table can freely move between transport and laterally extending position without disconnecting the driving train.

5. A pull-type combine including a wheeled frame adapted to be hitched in trailing relation to a tractor and having a laterally extending harvesting table, characterized by including an elongated rotary threshing and separating mechanism embodying an axially feeding cylinder mounted in said frame with the cylinder journalled longitudinally of the combine, said threshing and separating mechanism being substantially conical and mounted with its narrower end forward of the combine so as to feed harvested material from front to back of the frame, and an elevator for feeding harvested material from said table laterally into the threshing portion of said mechanism, said elevator and table extending laterally of said frame at the forward end thereof.

References Cited by the Examiner

UNITED STATES PATENTS

| 2,010,120 | 7/1935 | Welty | 56—228 X |
|---|---|---|---|
| 2,335,510 | 11/1943 | Hansen | 56—25 |
| 2,550,412 | 4/1951 | Girardi | 56—25 |
| 2,695,485 | 11/1954 | Krause et al. | 56—21 |
| 2,749,696 | 6/1956 | Innes | 56—21 |

FOREIGN PATENTS

| 421,031 | 5/1947 | Italy. |
|---|---|---|

ABRAHAM G. STONE, *Primary Examiner.*

ANTONIO F. GUIDA, *Examiner.*